United States Patent [19]

Bright

[11] Patent Number: 4,876,768
[45] Date of Patent: Oct. 31, 1989

[54] FISH SCALING APPARATUS

[75] Inventor: Clarence K. Bright, Davison, Mich.

[73] Assignee: Lil' Beaver Company, Davison, Mich.

[21] Appl. No.: 317,437

[22] Filed: Mar. 1, 1989

[51] Int. Cl.⁴ .............................................. A22C 25/02
[52] U.S. Cl. .......................................... 17/64; 17/65;
99/593
[58] Field of Search .................. 17/64, 65, 66, 67, 51;
99/567, 574, 593, 623

[56] References Cited

U.S. PATENT DOCUMENTS

| 128,796 | 7/1872 | Hard . |
| 343,141 | 6/1886 | Schaible . |
| 493,454 | 3/1893 | Tobin . |
| 745,861 | 12/1903 | Keller et al. . |
| 878,174 | 2/1908 | Yeakel . |
| 1,234,767 | 7/1917 | Junker . |
| 1,383,162 | 6/1921 | Sprague . |
| 1,683,968 | 9/1928 | Gallison . |
| 1,694,018 | 12/1928 | Mudge et al. . |
| 2,354,898 | 8/1944 | Wiksten . |
| 2,653,345 | 9/1953 | Kaplan . |
| 3,088,164 | 5/1963 | Simard . |
| 3,590,424 | 7/1971 | Shults . |
| 4,008,510 | 2/1977 | Laffin . |
| 4,173,051 | 11/1979 | Reid ...................................... 99/593 |
| 4,606,094 | 8/1986 | Evich . |
| 4,726,095 | 2/1988 | Bissell, Jr. et al. ..................... 17/64 |
| 4,763,386 | 8/1988 | Wissbroecker ......................... 17/64 |

FOREIGN PATENT DOCUMENTS

| 366185 | 12/1922 | Fed. Rep. of Germany . |
| 437620 | 9/1926 | Fed. Rep. of Germany . |
| 450571 | 10/1927 | Fed. Rep. of Germany . |
| 1151920 | 7/1958 | France . |
| 839464 | 9/1979 | U.S.S.R. . |
| 8996 | of 1900 | United Kingdom . |

Primary Examiner—Willis Little
Attorney, Agent, or Firm—Harness, Dickey & Pierce

[57] ABSTRACT

A fish scaling device and method for removing scales from varieties of fish. The fish scaler includes a bucket and lid designed to provide a connecting seal. Rotatably connected to the lid portion is a perpendicularly extending rod portion. A scaling element is attached to the rod. A plurality of scaling protrusions are attached to the exterior of the scaling element. A starter mechanism including a pull knob, rope, pullcord spring and circular spring coil provide for rotational motion of the scaling element. Rotation of the scaling element causes relative movement between the scaling protrusion and the suspended fish for removal of scales from the suspended fish. A circular spring coil allows for return rotational scaling motion.

5 Claims, 2 Drawing Sheets

FISH SCALING APPARATUS

BACKGROUND OF THE INVENTION

1. Field of the Invention

The present invention relates to an apparatus for removing scales from varieties of small and medium-sized fish.

2. Description of Related Art

Scale removal is a necessary procedure in the preparation of the common varieties of fish such as pan fish found on a typical fishing trip. Much of the scale removing procedure is still performed using some type of hand-held device. While this ensures a properly performed job, the drawback is that only one fish may be scaled at a time. This constraint has the effect of unnecessarily extending the time required to scale a plurality of fish in one sitting.

It has therefore been a goal in the art to provide an apparatus capable of removing scales from a number of fish concurrently. Several devices have been designed for such a purpose. In one type of device a bucket fish scaler is provided with an insertable cylindrical sleeve containing an abrasive surface and an electro-mechanical rotatable impeller to agitate the surrounding water. The fish are thus forced against the abrasive surfaces for scaling. An example of such devices are included in U.S. Pat. Nos. 4,726,095 to Bissell, Jr. and 4,763,386 to Wissbroecker. While this scaling device appears to be conceptually sound, problems have been encountered with damage to the fish fillet during the scaling operation. This is apparently a result of excessive impeller rotation due to electro-mechanical power input and also due to the use of abrasive edges which tend to cut into the fish during scaling.

Other fish scaler assemblies include horizontal cylinder and agitator assemblies with the horizontal agitators including a number of perpendicularly extending, longitudinally spaced rods. These rods typically embody the abrasive units required for the scaling operations. Examples of such devices are shown in German Patent No. 366,185 to Nordischer Maschinenbau and German Patent No. 437,620 to Robert Scheibel. While these devices may be effective in commercial applications, the present teaching includes a portable unit capable of being transported to relatively inaccessible environments. The shortcomings of the other, more cumbersome, devices are in this respect apparent.

These devices also require specialized assemblies for containment and processing of the fish by rotation of the agitator along the horizontal axis. The teachings of the present invention allow for the adaptability of commonly found five gallon buckets used by fishermen today for fish scaling purposes.

Therefore, it is an object of the present invention to provide an effective and lightweight fish scaling device and method of fish scaling capable of performing scaling operations on most varieties of small to medium sized fish without damage to the flesh of the fish. It is also a object of the present invention to provide a fish scaling device capable of being operated by manual means, therefore not constrained by the requirement of electro-mechanical power for rotation with the attendant requirement of an AC/DC power source.

It is still further an object of the present invention to provide a fish scaling apparatus embodying a novel rotatable scaling arm configuration useful in removing the scales from many varieties of fish.

SUMMARY OF THE INVENTION

According to the present invention there is provided a fish scaling apparatus for removal of scales from many varieties of fish. The scaling assembly includes a container for containing a quantity of fish suspended in water. A scaling element which is rotatable along a vertical axis is provided. The scaling element includes at least one horizontal and at least one vertical scaling arm. Located along the scaling arms is a plurality of flat edged scaling protrusions. Means for encouraging rotational movement of the scaling element is provided. The rotational movement of the scaling element thereby provides relative movement between the scaling protrusions and the scales of the fish such that the scales are removed without damage to the fish flesh.

A method for scaling a plurality of fish includes means for containing fish suspended in water in a confined environment. A scaling element rotatable about a vertical axis is provided. Circumferential rotation of the scaling element results relative movement between the scaling protrusion and the fish scales thereby removing the fish scales.

Additional benefits and advantages of the present invention will become apparent from the subsequent description of the preferred embodiments and the appended claims taken in conjunction with the accompanying drawings.

DESCRIPTION OF THE PREFERRED EMBODIMENT

Figures 1, 2:
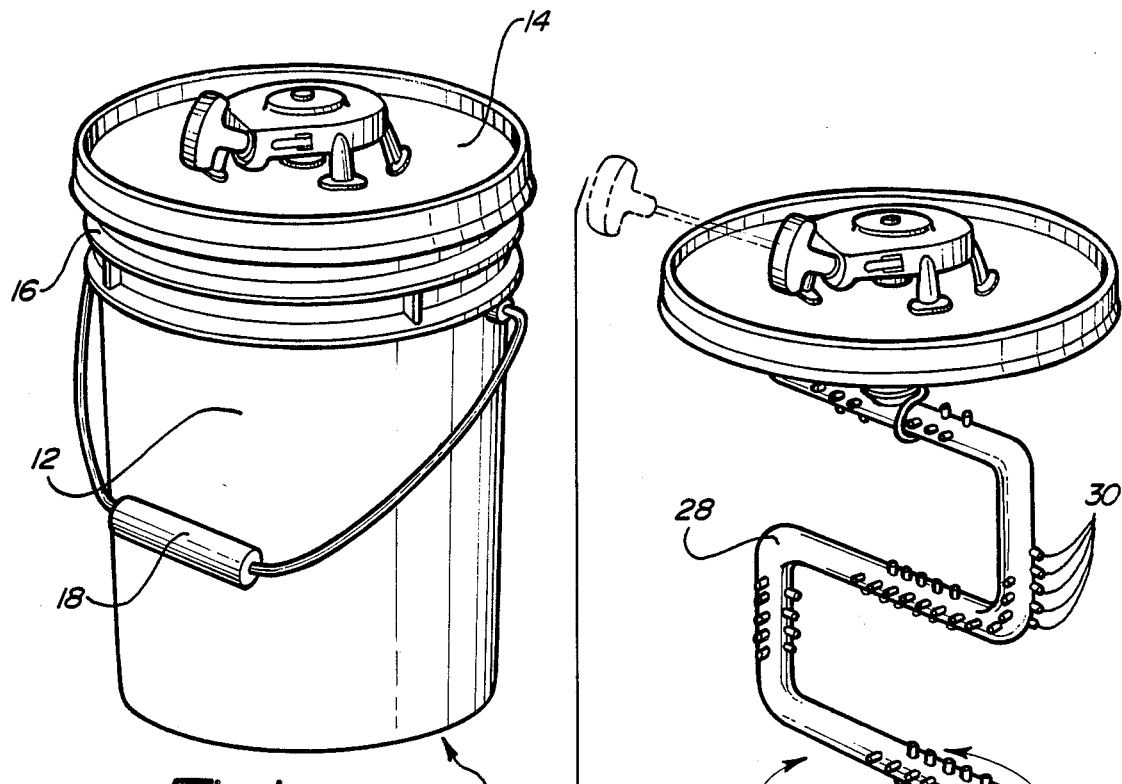
FIG. 1 is a perspective view of a fish scaling apparatus made in accordance with the teachings of the present invention.
FIG. 2 is an exploded perspective view showing the distinct components of the invention in their functional relationship.

Referring to FIG. 1, a fish scaling apparatus generally shown at 10 is provided. The fish scaling apparatus of the present invention includes a cylindrical bucket 12 of predetermined volume with a flat bottom portion and a symmetrical wall equidistant in radius along its rotational axis. A lid 14 is provided being of circular shape and dimension. Means of attaching the bucket and lid to effect a watertight seal are provided by a depending lip 16 which is located along the periphery of the upper outer edge of the cylindrical bucket. Transportation of the fish scaling apparatus 10 is facilitated by a handle 18. A recoil starter element 20 is provided and has a scaling element 28 operably attached thereto as further described below.

Figure 4:
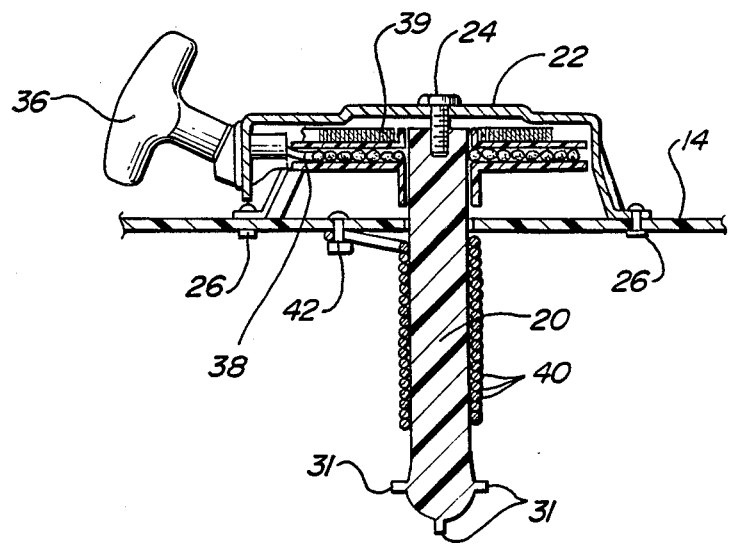
FIG. 4 is a sectional view of the pull start apparatus taken along line 4—4 of FIG. 3 used to provide rotational movement to the scaling element.

Referring to FIG. 4, a rod portion 20 of scaling element 28 is provided. In order to rotatably secure the rod portion 20 to the starter housing assembly 22 a securing bolt 24 is provided. The housing assembly 22 is in turn fastened to the lid portion 14 by means of nut and screw assemblies 26.

Figure 3:
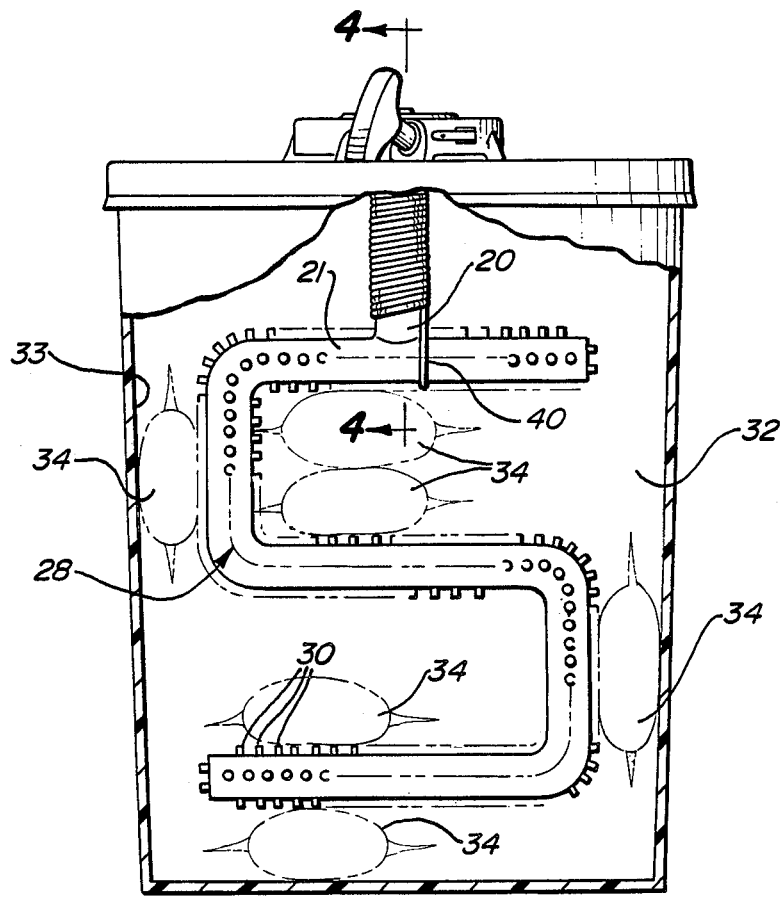
FIG. 3 is a cut-away view of the invention teaching the manner in which the fish are scaled.

Referring to FIGS. 2 and 3, scaling element 28 includes at least one horizontal rod member interconnected with at least one vertical rod member. The dimensions of the scaling element are chosen to ensure that the radially outermost portion of either the vertical or horizontal rod members do not inhibit the passage of fish between these outermost portions and the inside surface 33 of the bucket 12. Preferably, a plurality of horizontal and vertical rod members, connected one to another by means of successive ninety degree angles thereby forming an 'S' shape, as shown in FIG. 3 are utilized. The scaling element 28 is fastened to the rod portion 20 by means of an initial arm 21 in a perpendicular orientation such that rod portion 20 acts as the axis of rotation for the scaling element 28.

Attached to the exterior surface of the rod members of scaling element 28 are a plurality of flat-ended scaling protrusions 30 which have a generally cylindrical cross-section. It has been found that such a flat surface 31 provides at its intersection with the rounded sides of each protrusion an appropriate edge to catch and remove the scales substantially without cutting or other damage to the fish flesh. The angular edge defined by such a configuration is about 90°, but may vary without deviating from the scope of the present invention, provided the protrusion will scale the fish without damage to the remaining portions of the fish. Additionally, such an edge can easily be renovated merely by filing the flat surfaces 31 of scaling protrusions 30 flat when necessary.

While a circular cross-section for the scaling protrusion is preferred, other cross-sectional shapes could be utilized. For instance square, hexagonal, diamond, triangular or non-geometrical cross sections could be utilized provided that the protrusion formed thereby provides scaling of the fish without substantial damage to the fish flesh.

Preferably, the scaling element 28, scaling protrusions 30 and vertical rod 20 are produced as one piece by a thermoplastic molding operation from a suitable engineering plastic. However, equivalents of scaling element 28 may be produced by other methods such as by attaching of metal scaling protrusions to a thermoplastic core scaling element.

The protrusions 30 are preferably spaced about the cross-sectional circumference of the rod at every ninety degrees such as shown in FIG. 4. However, other protrusion configurations may be used provided adequate scaling capability is retained.

Prior to commencement of scaling operation, a predetermined quantity of water 32 is placed within the cylindrical bucket 12. A pre-determined number of fish 34 are also introduced. Rotation of the scaling element 28 will result in the suspended fish 34 being scaled by the scaling protrusions 30. In operation the scaling element is configured in such a way as to allow for relative movement between the suspended fish and the scaling protrusions of the horizontal or vertical rod members to provide the scaling of the fish. Thus it is preferred that the rod members ar designed for minimum resistance in the water medium as the operation of the unit is enhanced when a minimum of water currents are present in the container.

Referring again to FIG. 4, a means of generating rotational motion of the scaling element 28 is accomplished by a recoil starter assembly 36. A rope 38 is provided and is fastened at one end to the pull knob 36 and at the other to a pullcord spring 39 to provide for rewinding of rope 38. To facilitate return rotational motion of the scaling element 28 a circular spring coil 40 is provided. The coil 40 is fastened at one end to the lid portion 14 by means of a nut and bolt assembly 42. A downwardly extending appendage of the coil 40 engages the initial horizontal scaling element to complete the connection (see FIG. 3).

In operation, once the scaling element 28 completes its initial rotational motion in a first rotational direction, potential energy generated within the spring coil 40 is released incurring rotation of the scaling element 28 in a second direction opposite the first. Scaling operations are thus performed as a result of the rotational motion of the horizontal and vertical rod members, thus enhancing relative movement between the scaling protrusions and the fish while at the same time acting to reduce currents in the water medium due to the opposing directions of rotation of scaling element 28. While the above configuration is preferred, other apparatuses could be utilized for manual rotation of the scaling element without deviating from the scope of the present invention. For instance, the use of a hand grip attached to the scaling element would allow manual actuation of the scaling element in accordance with the teachings of the present invention.

Thus, in accordance with the teachings of the present invention, a method for scaling a plurality of fish is provided. The method includes the following steps: (a) providing a container for containing a plurality of fish suspended in a liquid medium; (b) placing a predetermined quantity of fish having scales to be removed and a predetermined quantity of water in the container of step a; (c) providing a scaling element rotatable about a vertical axis, the scaling element having at least one vertical rod member and at least one horizontally extending rod member, with at least one of the rod members including a plurality of scaling protrusions extending therefrom; (d) manually rotating the scaling element in a first circumferential direction for providing contact with and relative movement between the scales of the fish and the scaling protrusions; rotating the scaling element in a second circumferential direction opposite to that of the first for providing a second direction of contact between the scales of the fish and the scaling protrusions; and (f) repeating steps d and e until such time as substantially all the scales are removed from the fish.

As set forth above the means for containing a plurality of fish suspended in a liquid medium such as water. is preferably a plastic '5' gallon bucket readily available and commonly in use by fishermen today. This allows the method of the present invention to be utilized with inexpensive readily available equipment.

Preferably, from about 20 to about 30 panfish (approximately 6–12 inches in size) may be scaled by placing them in the container with enough water to cover the uppermost portion of the scaling element 28.

The quantity of fish and quantity of water can be adjusted according to the size of the fish and the number of fish to be scaled according to the most efficient operation of the scaler. Thus, if only a few fish are being scaled it may only be necessary to use a lesser amount of water to accomplish scaling. Or if the fish are larger (such as 12 to 16 inch bass) the number of fish which can be effectively scaled at one time would be reduced.

The scaling element must be rotatable about a vertical axis and includes horizontal and vertical rod members which include scaling protrusions which are substantially non-cutting to fish flesh in normal use of the present invention in accordance with the teachings herein.

In the method of the present invention the scaling element is rotated in first and second circumferential directions which optimizes the contact and relative movement between the scaling protrusions and the scales of the fish. Thus, these scaling protrusions contact the fish scales in different directions and at different orientations to substantially scale the entire fish regardless of its orientation in the container. The 'S' shape of the scaling element tends to orient the fish in vertical, horizontal or both orientations during the course of the scaling process to provide thorough scaling of the fish.

It is critical to the present invention that the method used is manual or hand operated such that the forces between the scaling protrusions and the fish scales may be controlled and are not excessive whereby scaling is accomplished substantially without tearing or cutting of the fish flesh.

While the above description constitutes the preferred embodiment of the present invention, it would be appreciated that the invention is susceptible to modification, variation and change without departing from the proper scope and fair meaning of the accompanying claims.

What is claimed is:

1. A fish scaling apparatus for removal of scales from fish, said apparatus comprising:
   a container means for containing a predetermined quantity of fish suspended in water;
   a scaling element rotatable about a substantially vertical axis, said scaling element including at least one horizontal rod member and at least one vertical rod member;
   a plurality of scaling protrusions attached to and extending from at least one of said vertical or horizontal rod members, said scaling protrusions for scaling of the fish in response to relative motion between the fish and said scaling protrusions, said scaling protrusions providing for removing scales of the fish substantially without damage to the remaining portion of the fish; and
   a manually operated means for providing rotational motion to said scaling element in said container means thereby providing contact between and relative motion between said scaling protrusions and said fish for scaling of said fish.

2. The apparatus of claim 1 wherein said means for providing rotational motion further comprises a means for providing rotational motion to said scaling element in a first direction and for thereafter providing rotation motion to said scaling element in a second and opposite direction.

3. The apparatus of claim 1 wherein said scaling element further comprises a plurality of horizontal and vertical rod members for defining an 'S' shaped scaling element.

4. The apparatus of claim 1 wherein the spacial margin between the outermost radial edges of said scaling member and the inner wall of said retaining bucket is adequate to allow the passage of a fish there between.

5. A method for scaling a plurality of fish comprising the steps of:
   a. providing a means for containing a plurality of fish suspended in a liquid medium;
   b. placing a predetermined quantity of fish having scales to be removed and a predetermined quantity of water in said means of step a;
   c. providing a scaling element rotatable about a vertical axis, said scaling element having at least one vertical rod member, at least one horizontally extending rod member and at least one of said rod members including a plurality of scaling protrusions extending therefrom;
   d. manually rotating said scaling element in a first circumferential direction for providing contact and relative movement between scales of the fish and said scaling protrusions;
   e. manually rotating said scaling element in a second circumferential direction opposite to that of the first providing a second direction of contact between the scales of the fish and the scaling protrusions; and
   f. repeating said steps d and e until such time as substantially all the scales are removed from the fish.

* * * * *

UNITED STATES PATENT AND TRADEMARK OFFICE
CERTIFICATE OF CORRECTION

PATENT NO. : 4,876,768

DATED : October 31, 1989

INVENTOR(S) : Clarence K. Bright

It is certified that error appears in the above-identified patent and that said Letters Patent is hereby corrected as shown below:

On the Title Page under "Foreign Patent Documents", "8996 of 1990 United Kingdom" should be --8996 7/1900 United Kingdom--;

Col. 1, Line 62, "a" should be --an--;

Col. 3, Line 58, "ar" should be --are--;

Col. 4, Line 47, "water." should be --water--.

Signed and Sealed this

Nineteenth Day of March, 1991

Attest:

HARRY F. MANBECK, JR.

*Attesting Officer*          *Commissioner of Patents and Trademarks*